United States Patent
Grawrock

(10) Patent No.: US 7,089,595 B1
(45) Date of Patent: Aug. 8, 2006

(54) DEVICE AND METHOD FOR DISABLING AN OVERRIDE HARDWARE PIN ASSERTION

(75) Inventor: David W. Grawrock, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/540,614

(22) Filed: Mar. 31, 2000

(51) Int. Cl.
 *G06F 12/14* (2006.01)

(52) U.S. Cl. .................. 726/36; 713/310; 713/300; 713/324; 713/330; 713/202; 713/200; 726/35

(58) Field of Classification Search ............. 713/200; 726/35, 36
See application file for complete search history.

(56) References Cited

U.S. PATENT DOCUMENTS

| | | | | |
|---|---|---|---|---|
| 4,841,492 A | * | 6/1989 | Russell | 367/105 |
| 5,231,666 A | * | 7/1993 | Matyas | 705/75 |
| 5,249,227 A | * | 9/1993 | Bergum et al. | 713/194 |
| 5,349,643 A | * | 9/1994 | Cox et al. | 713/155 |
| 5,401,921 A | | 3/1995 | D'Antonio et al. | |
| 5,451,912 A | * | 9/1995 | Torode | 331/108 C |
| 5,457,748 A | * | 10/1995 | Bergum et al. | 380/270 |
| 5,778,070 A | | 7/1998 | Mattison | |
| 5,812,861 A | * | 9/1998 | Ishac et al. | 713/324 |
| 5,844,986 A | | 12/1998 | Davis | |
| 5,901,284 A | * | 5/1999 | Hamdy-Swink | 713/200 |
| 5,919,257 A | * | 7/1999 | Trostle | 713/200 |
| 5,935,242 A | * | 8/1999 | Madany et al. | 713/1 |
| 5,937,063 A | * | 8/1999 | Davis | 713/187 |
| 5,944,821 A | * | 8/1999 | Angelo | 713/200 |
| 5,949,272 A | * | 9/1999 | Bickford et al. | 327/407 |
| 5,954,818 A | * | 9/1999 | Dalvi et al. | 713/200 |
| 5,978,860 A | * | 11/1999 | Chan et al. | 710/8 |
| 6,073,243 A | * | 6/2000 | Dalvi et al. | 713/202 |
| 6,121,635 A | * | 9/2000 | Watanabe et al. | 257/91 |
| 6,487,667 B1 | * | 11/2002 | Brown | 713/201 |

OTHER PUBLICATIONS

Schneier, Bruce, "Applied Cryptography: Protocols, Algorithms, and Source Code in C," 2nd ed., Oct. 1995, section 2.6, pp. 34-41; pp. 574-577.

* cited by examiner

*Primary Examiner*—Syed A. Zia
(74) *Attorney, Agent, or Firm*—Blakely, Sokoloff, Taylor & Zafman LLP

(57) ABSTRACT

One embodiment of present invention is a method for preventing the modification of a primary pass-phrase of an electronic system. Access to stored information such as a primary pass-phrase is disabled despite assertion of an override pin of an integrated circuit device of the electronic device when an override disable pin of the integrated circuit device is asserted prior to assertion of the override pin.

18 Claims, 3 Drawing Sheets

DEVICE AND METHOD FOR DISABLING AN OVERRIDE HARDWARE PIN ASSERTION

BACKGROUND

1. Field

This invention relates to the field of data security. In particular, the invention relates to an apparatus and method for protecting confidential information stored within an electronic system.

2. Background

Advances in technology have opened up many opportunities for applications that go beyond the traditional ways of doing business. Electronic commerce (e-commerce) and business-to-business (B2B) transactions are now becoming popular, reaching the global markets at a fast rate. Unfortunately, while electronic systems like computers provide users convenient and efficient methods of doing business, communicating and transacting, they are also vulnerable for unscrupulous attacks. Examples of these attacks include virus, intrusion, exposure of private information, and tampering, to name a few. Therefore, it is becoming more and more important to protect the integrity of the contents of a computer, primarily to maintain user confidence in computer based transactions.

Recently, some Intel® Architecture computers are being employed with a firmware hub. To reduce the risk of unauthorized tampering with the stored contents of the firmware hub, control application software can be installed within the computer. The control application software is designed to preclude the deletion of data stored within flash memory of the firmware hub unless this software detects that the user correctly entered a previously negotiated pass phrase.

In the event that the pass phrase is forgotten by the user, the firmware hub includes an override pin which, when asserted, signals the control application software to ignore the current pass phrase and enable a new pass phrase to be created. In certain situations, however, the override pin can be misused. For example, security features of a stolen computer can be deleted from the flash memory of the firmware hub after assertion of the override pin and entering of a new pass phrase selected by the thief.

There exists a need to temporarily disable the override pin to provide users of electronic systems with an ability to eliminate this recognized breach of system security.

BRIEF DESCRIPTION OF THE DRAWINGS

The features and advantages of the present invention will become apparent from the following detailed description of the present invention in which.

DESCRIPTION

The present invention relates to an apparatus and method for protecting information stored within an electronic system. More specifically, the invention comprises the addition of an override disable pin to the packaging architecture of an integrated circuit device such as the firmware hub for example. When asserted, the override disable pin sets a non-volatile bit storage element within the integrated circuit device. In the event that the override pin of the integrated circuit device is asserted, control application software running on the electronic system checks whether the non-volatile bit storage element is set and if so, denies the user access to information stored within the integrated circuit device unless a previously negotiated pass phrase is entered.

Herein, certain details are set forth in order to provide a thorough understanding of the present invention. It is apparent to a person of ordinary skill in the art, however, that the present invention may be practiced through many embodiments other that those illustrated. Well-known circuits are not set forth in detail in order to avoid unnecessarily obscuring the present invention.

In the following description, terminology is used to discuss certain features of the present invention. For example, an "electronic system" includes any product that requires user authentication before providing access to its stored content. Examples of an electronic system include, but are not limited or restricted to a computer (e.g., desktop, a laptop, a server, a workstation, a hand-held, etc.), desktop office equipment (e.g., photocopier, printer, scanner, etc.), a television set-top box, and the like. A "link" is broadly defined as one or more information-carrying mediums (e.g., electrical wire, optical fiber, cable, bus, etc.) or wireless communications through infrared, radio frequency (RF) signaling, or any other wireless signaling mechanism.

In addition, the term "information" is defined as one or more bits of data, address, and/or control. A "pass-phrase" is a series of bits originating from a string of inputted alphanumeric characters, voice patterns and the like. In the context of information, the term "modify" (and related tenses) involves an act of either (i) adding, or (ii) deleting, or (iii) overwriting information. A "cryptographic operation" is an operation performed for additional data security such encryption, decryption, performing computations involving a digital signature, performing computations involving a digital certificate, and the like.

Figure 1:
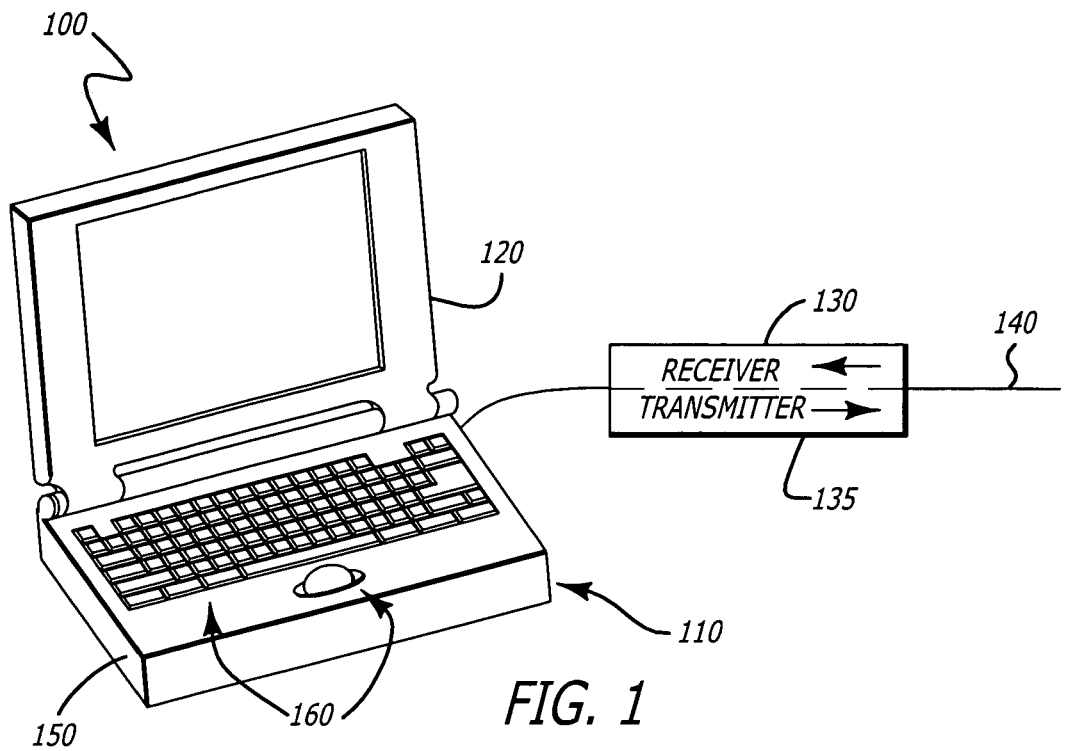
FIG. 1 is an exemplary block diagram of an embodiment of a product employing an electronic system practicing the invention.

Referring to FIG. 1, a perspective view of an illustrative embodiment of a product employing the present invention is shown. The product 100 comprises an electronic system 110 for processing data and a monitor 120 for displaying such data. The monitor 120 may include a flat panel display (e.g., liquid crystal display, active matrix display, etc.), a cathode ray tube, or any other type of display technology. The electronic system 110 further includes a receiver 130 to receive information over a link 140 and/or a transmitter 135 to transmit information over the link 140. For example, the receiver/transmitter 130/135 may include a modem that is situated external to a chassis 150 of the product 100 (as shown) or internal circuitry (e.g., a modem card, networking card, etc.) placed within the chassis 150.

Referring still to FIG. 1, for this embodiment, the electronic system 110 receives as input information from one or more user input devices 160. The user input device 160 may be integrated within or physically remote from the chassis 150. Examples of a user input device 160 include, but are not restricted or limited to a keyboard, a keypad, a trackball, a mouse, a stylus, a microphone and the like.

Figure 2:
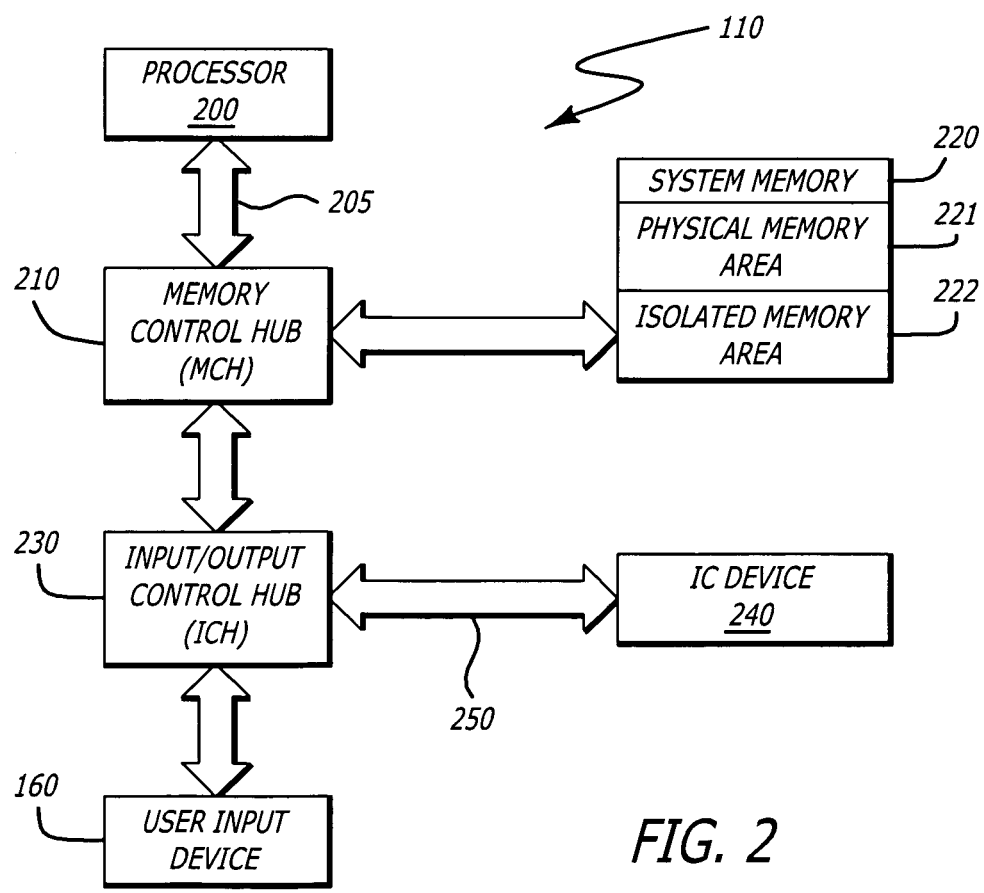
FIG. 2 is an exemplary block diagram of an embodiment of the electronic system including a packaged IC device having an override disabled pin.

Referring now to FIG. 2, an illustrative block diagram of an embodiment of an electronic system 110 is shown. Electronic system 110 includes a processor 200, a memory control hub (MCH) 210, a system memory 220, an input/output control hub (ICH) 230, and a packaged integrated circuit (IC) device 240 (e.g., a firmware hub) which supports communications with at least one of the user input devices 160 of FIG. 1. The packaged IC device 240 features protected non-volatile memory memory and cryptographic logic as described in FIG. 3.

In general, the packaged IC device 240 operates in a plurality of modes. For example, the packaged IC device 240 may be placed in an administrator mode when the user issues a request to alter the functionality of the electronic system 110. This is accomplished by controlling access to entering the administrator mode, possible through modification of its stored contents. Otherwise, the packaged IC device 240 operates in a user mode. For example, when performing cryptographic operation, like digitally signing information or encrypting/decrypting information, for example, the IC device 240 is in user mode.

As shown in FIG. 2, the processor 200 represents a central processing unit of any type of architecture, such as complex instruction set computers (CISC), reduced instruction set computers (RISC), very long instruction word (VLIW), or hybrid architecture. In one embodiment, the processor 200 is compatible with the Intel® Architecture (IA) processor, such as the IA-32 and the IA-64. Of course, in an alternative embodiment, the processor 200 may include multiple processing units coupled together over a common host bus 205.

Coupled to the processor 200 via the host bus 205, the MCH 210 may be integrated into a chipset that provides control and configuration of memory and input/output devices such as the system memory 220 and the ICH 230. The system memory 220 stores system code and data. The system memory 220 is typically implemented with dynamic random access memory (DRAM) or static random access memory (SRAM). It is contemplated, however, that the system memory 220 may be segmented into an accessible physical memory area 221 and an isolated memory area 222. Access to contents within the isolated memory area 222 is restricted and enforced by the processor 200 and/or the MCH 210 or other chipset that integrates the isolated area functionalities. The system memory 220 may also include other programs or data that are not shown.

The ICH 230 may also be integrated into a chipset together or separate from the MCH 210 to perform I/O functions. As shown, the ICH 230 enables communications to the packaged IC device 240 via link 250 from one or more user input devices 160 (e.g., a keyboard, keypad, etc.). Also, the ICH 230 enables communications to devices coupled to other links such as a Peripheral Component Interconnect (PCI) bus at any selected frequency (e.g., 66 megahertz "MHz", 100 MHz, etc.), an Industry Standard Architecture (ISA) bus, a Universal Serial Bus or another bus configured with a different architecture than those briefly mentioned.

Figure 3:
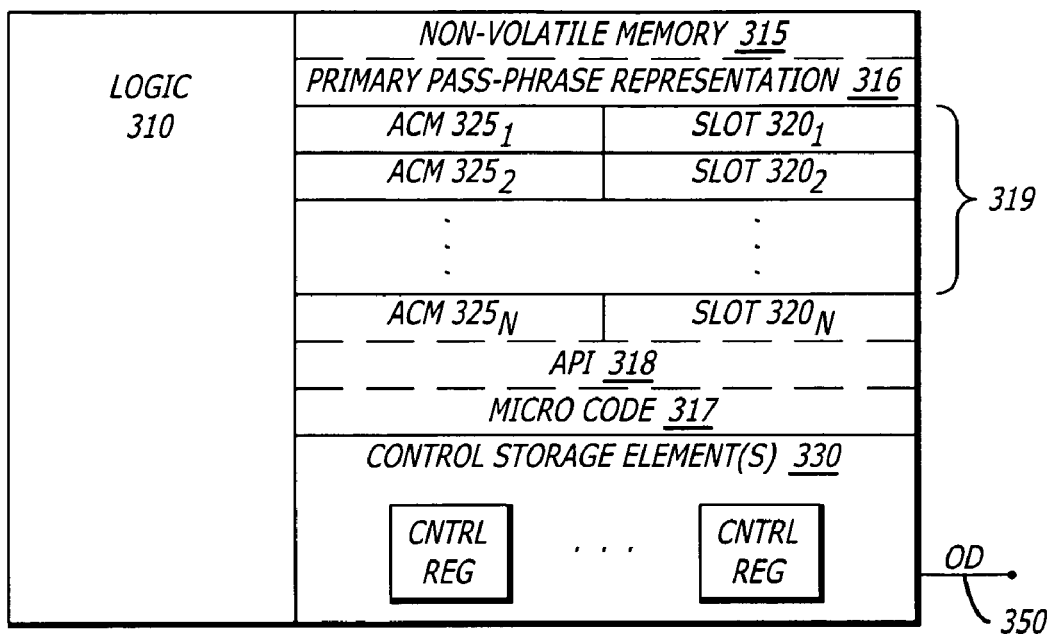
FIG. 3 is an exemplary block diagram of the IC device of FIG. 2.

Referring to FIG. 3, an illustrative block diagram of the packaged IC device 240 is shown. The packaged IC device 240 comprises one or more integrated circuits placed within a protective IC package 300. For clarity sake, the packaged IC device 240 is based on an integrated circuit that comprises (i) logic 310 to perform a cryptographic operation, (ii) a non-volatile memory 315 (e.g., flash memory), and (iii) one or more control storage elements 330.

In particular, one portion of the non-volatile memory 315 is loaded with a representation 316 of the primary pass-phrase such as a hash value (result after the pass-phrase undergoes a one-way hash function) or any other computed value. Of course, the representation 316 could be the primary pass-phrase in its entirety.

Another portion of the non-volatile memory 315 includes microcode 317 that communicates with control application software executed by the processor 200 and accessible by the user. When the user desires to modify stored contents of the non-volatile memory, the control application software sends a message to the microcode 317 to determine whether or not access is granted or denied. One parameter of the message includes a previously negotiated, primary pass-phrase; however, other parameters of the message are based on the chosen Application Programming Interface (API) 318 between the microcode 317 and the control application software.

Another portion 319 of the non-volatile memory 315 is segregated into a plurality "N" of protected storage areas $320_1$–$320_N$ (N≦1), each having a predetermined size (referred to as "slots"). Each slot $320_1$–$320_N$ features an access control mechanism (ACM) $325_1$–$325_N$ that determines whether the user has access to the particular slot $320_1$, . . . , $320_N$. For example, access control mechanism $325_1$ determines whether a secondary pass-phrase, provided by the user, indicates that user has access to the contents of the slot $320_1$.

As further shown in FIG. 3, the control storage element(s) 330 of the packaged IC device 240 is set upon assertion of an override disable pin 350. In one embodiment, the control storage element 330 includes one or more control registers configured for permanent state retention, namely maintaining its bit state through any number of power cycles. The control storage element 330 can be cleared only by providing the correct primary pass-phrase to place the packaged IC device into an administrator mode and clearing the state of the storage element 330 thereafter.

Figure 4:
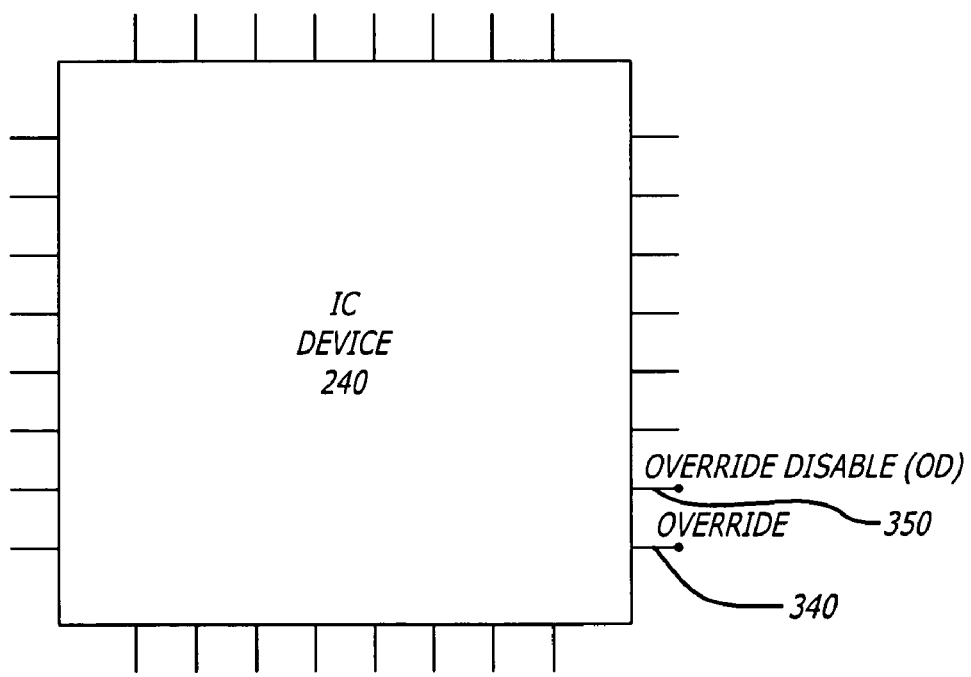
FIG. 4 is an exemplary block diagram of the pin configuration of the package of the IC device.

As shown in FIG. 4, package 300 may include a 32-pin package featuring an override pin 340 and an override disable (OD) pin 350, although any size package may be used provided its pin configuration supports override and override disable signaling. In general, the assertion of the override pin 340 signals the control application software 225 to ignore the current, primary pass-phrase and allows the user to modify the primary pass-phrase. The assertion of the override disable pin 350 effectively signals the control application software running on the electronic system 110 to ignore the assertion of the override pin 310 and still requires entry of the correct primary pass-phrase to gain access to stored content of the integrated circuit(s).

Figure 5:
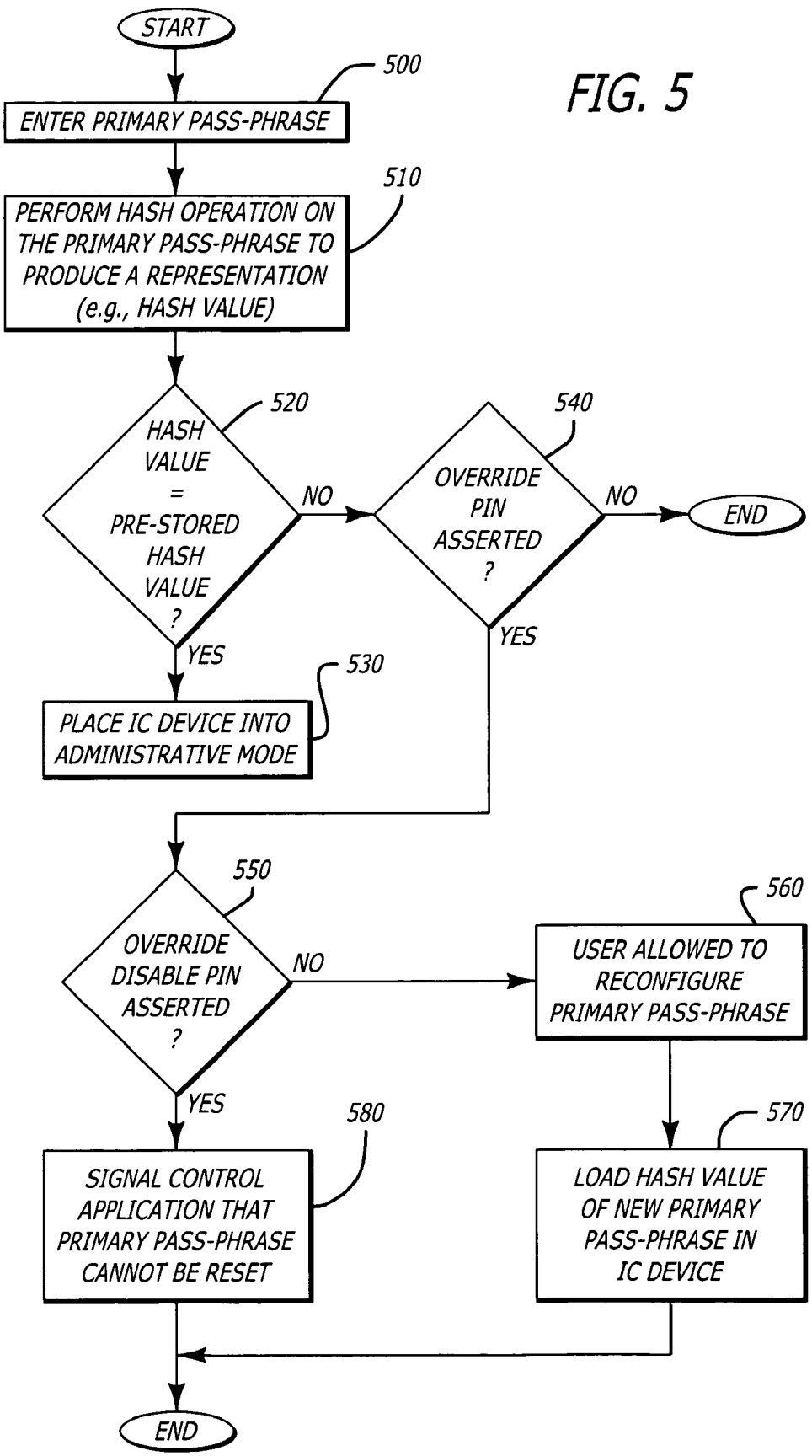
FIG. 5 is an exemplary flowchart of the operations of the packaged IC device.

Referring now to FIG. 5, a flowchart of the operations for disabling an override hardware pin assertion for the electronic system is shown. First, the user places the IC device into an administrator mode. For example, this may accomplished by the user selecting a control panel, which causes a window to be generated. The user enters a primary pass-phrase within a selected field of the window and selects an ENTER button on the window. The primary pass-phrase undergoes a computation (e.g., a one-way hash function) to produce a representation (e.g., hash value) and one or more parameters, inclusive of the representation, is transferred through the API to the microcode (blocks 500 and 510). The microcode compares the incoming representation with a prestored representation such as comparing the incoming hash value with a prestored hash value (block 520). If the primary pass-phrase is correct, the IC device is placed in the administrator mode (block 530). Otherwise, the IC device remains in its user mode.

During the administrator mode, the primary pass-phrase may be modified, the contents of the control storage element may be modified, or the contents of the slots within the non-volatile memory of the IC device may be deleted. However, if it is desirable to modify the contents of the first slot for example, the user is required to enter a secondary pass-phrase. Similarly, as described above, the input secondary pass-phrase undergoes a hash function to produce a hash value that is compared with a hash value prestored by the microcode. This prestored hash value associated with the first slot is contained in the storage area associated with the access control mechanism of the first slot. If the secondary pass-phrase is correct, the contents may be altered. Otherwise, the contents are not modifiable, but can be deleted and restored.

If the user fails to remember his or her primary pass-phrase, the override pin of the IC device may be asserted (block 540). If the override disable pin has not been previously asserted so that the control storage element is set, the user may reconfigure the electronic system with a new primary pass-phrase (blocks 550 and 560). Upon selection, a representation (e.g., hash value) of the new primary pass-phrase is loaded into the non-volatile memory of the IC device (block 570). However, if the control storage element is set, the IC device signals the control application software that the user may not gain access to the stored content of the IC device unless the correct primary pass-phrase is entered (blocks 550 and 580).

In summary, in the normal case, when the override disable pin is not set, a system of the override pin allows the user to reset the primary pass-phrase and give access to the administrator mode. However, when the override disable pin is set, access to the administrator mode is restricted to only those parties who recall the primary pass-phrase.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
   implementing an integrated circuit device within an electronic system, the integrated circuit device including a control storage element, an override disable pin and an override pin which, when asserted, allows a stored representation of a primary pass-phrase to be modified; and
   preventing modification of a representation of the primary pass-phrase when the override disable pin is asserted by (i) setting the control storage element within the integrated circuit device upon assertion of the override disable pin and (ii) disabling modification of the primary pass-phrase when the control storage element is set, the primary pass-phrase permitting access to stored information within a non-volatile memory of the integrated circuit device implemented within the electronic system when the primary pass-phrase is input by the user and the primary pass-phrase is determined to be correct based on a comparison conducted between a value computed from the primary pass-phrase and the representation of the primary pass-phrase.

2. The method of claim 1, wherein the integrated circuit device comprises a package to form a packaged integrated circuit device.

3. The method of claim 1, wherein the control storage element is set after placing the electronic system in an administration mode upon correctly inputting the primary pass-phase into the electronic system.

4. The method of claim 1, wherein the preventing of the modification of the primary pass-phrase includes signaling a control application software initiating a request for modification of the pass-phrase that a user is denied access to the stored information of the integrated circuit device unless the primary pass-phrase is correctly entered and prohibiting modification of the representation of the primary pass-phrase.

5. The method of claim 1, wherein the representation of the primary pass-phrase includes a hash value of the primary pass-phrase.

6. The method of claim 1, wherein control storage element includes at least one control register configured for permanent state retention over a plurality of power cycles.

7. A method comprising:
   enabling access to stored information within an electronic system, the information including a representation of a primary pass-phrase, upon assertion of an override pin of an integrated circuit device; and
   disabling access to the stored information despite assertion of the override pin of the integrated circuit device when the integrated circuit device is powered on and an override disable pin of the integrated circuit device is asserted prior to assertion of the override pin unless the primary pass-phrase is correctly supplied by a determination using the representation of the primary pass-phrase, the disabling of access comprises (i) setting a control storage element within the integrated circuit device in response to the assertion of the override disable pin, and (ii) determining whether the control storage element is set.

8. The method of claim 7, wherein the integrated circuit device comprises a package to form a packaged integrated circuit device.

9. The method of claim 7, wherein the control storage element is set after placing the electronic system in an administration mode upon correctly inputting the primary pass-phrase into the electronic system.

10. The method of claim 7, wherein the setting of the control storage element includes setting a bit of at least one control register configured for permanent state retention over a plurality of power cycles.

11. A method comprising:
    enabling placement of an integrated circuit device of an electronic system into an administrator mode upon assertion of an override pin of the integrated circuit device, data stored within the integrated circuit device can be cleared only when the integrated circuit device is placed in the administrator mode; and
    disabling placement of the integrated circuit device of the electronic system into the administrator mode despite assertion of the override pin of the integrated circuit device when an override disable pin of the integrated circuit device is asserted prior to assertion of the override pin so that the primary pass-phrase needs to be supplied before access to the data stored within the integrated circuit device is allowed, the disabling of access comprises (i) setting a control storage element within the integrated circuit device in response to the assertion of the override disable pin, and (ii) determining whether the control storage element is set.

12. The method of claim 11, wherein the integrated circuit device comprises a package to form a packaged integrated circuit device.

13. The method of claim 11, wherein the setting of the control storage element includes setting a bit of at least one control register configured for permanent state retention over a plurality of power cycles.

14. An electronic system comprising:
a bus;
a processor coupled to the bus;
a system memory coupled to the bus; and
an integrated circuit device coupled to the bus, the integrated circuit device including:
  an integrated circuit package,
  a memory contained to the integrated circuit package,
  an override pin of the integrated circuit package to enable access to and modification of a representation of a primary pass-phrase upon assertion of the override pin, the primary pass-phrase permitting access to information stored within the memory,
  an override disable pin of the integrated circuit package to disable access to and modification of a representation of the primary pass-phrase despite the assertion of the override pin when the override disable pin is asserted prior to assertion of the override pin, and
  a microcode to determine whether the override disable pin has been asserted prior to assertion of the override pin.

15. The electronic system of claim 14, wherein the integrated circuit further comprises a package to contain the memory from which the override pin and the override disable pin protrude.

16. The electronic system of claim 14, wherein the memory of the integrated circuit device is non-volatile memory.

17. The electronic system of claim 14, wherein the integrated circuit device further includes a control storage element.

18. The electronic system of claim 17, wherein the control storage element of the integrated circuit device includes at least one control register configured for permanent state retention over a plurality of power cycles.

* * * * *

UNITED STATES PATENT AND TRADEMARK OFFICE
CERTIFICATE OF CORRECTION

PATENT NO. : 7,089,595 B1
APPLICATION NO. : 09/540614
DATED : August 8, 2006
INVENTOR(S) : Grawrock Page 1 of 1

It is certified that error appears in the above-identified patent and that said Letters Patent is hereby corrected as shown below:

In column 4, at line 18, delete "(N≦1)" and insert --(N≥1)--.

Signed and Sealed this

Sixth Day of November, 2007

JON W. DUDAS
*Director of the United States Patent and Trademark Office*